No. 789,812.

Patented May 16, 1905.

UNITED STATES PATENT OFFICE.

GEORGE F. KUNZ, OF NEW YORK, N. Y.

LUMINOUS COMPOSITION.

SPECIFICATION forming part of Letters Patent No. 789,812, dated May 16, 1905.

Application filed December 23, 1903. Serial No. 186,381.

*To all whom it may concern:*

Be it known that I, GEORGE F. KUNZ, a citizen of the United States of America, residing at New York city, in the county of New York and State of New York, have invented certain new and useful Improvements in Luminous Compositions, of which the following is a specification.

My invention has reference to luminous compositions, and particularly to a composition containing a radio-active material and a radio-responsive material, the object of my invention being to provide a composition having a much greater luminosity than either of the isolated radio-active or radio-responsive constituent parts.

Among the list of known radio-active materials which can be used in carrying out my invention may be mentioned radium compounds, polonium, actinium, radio-active tellurium, radio-active bismuth, barium, radio-active thorium, radio-active lead, and helium. Other materials containing the property of radio-activity, if so proven, may be used with like effect.

As radio-responsive materials may be mentioned willemite, zinc-sulfid, phosphorescent calcium-sulfid, kunzite, the diamond and other precious stones, although other minerals or chemicals organic or inorganic may be used.

Up to the present time radium as an element has not been isolated and is only known in the compound form as radium chlorid, radium bromid, radium barium carbonate, &c., although radium is believed to be an element, as its spectrum contains several positively-new lines.

I have determined by experiment that a mass of high luminosity may be obtained by the admixture of substances or materials having radio-active properties and materials having radio-responsive properties—that is to say, by the mixture of materials which become luminous or are rendered more highly luminous when brought into contact with materials of higher radio-activity—it being understood, however, that the increased luminosity of the responsive bodies may act upon the radio-active bodies to stimulate or increase their radio-active properties.

In carrying out my invention I mix, as an example, pulverulent or granular radium material—say radium barium carbonate and pulverulent or granular willemite—in variable or equal proportions. The mixture so produced possesses a lasting luminosity, exceeding that of the radium material in a marked degree. A like effect is produced by mixing the radium material or other radio-active material directly with sulfid of zinc or zinc oxid, and other natural or artificial compounds of zinc, even if some of the latter be of low radio-responsiveness. Similar effects may be obtained by substituting other radio-active and radio-responsive bodies for those just mentioned.

If the materials are of high radio-activity, ordinary glass holds back certain rays, presumably ultra-violet, which do not penetrate the glass. From experiment, however, it is known that quartz (rock-crystal) permits the free passage of the ultra-violet or other rays obstructed by ordinary glass, and it is therefore best to use either bottles or vials of quartz (rock-crystal) or small flat or hemispherical plates of this substance to be inserted in the glass, wood, or other receptacle for the luminous compositions, thus permitting the free passage of all the radio-active rays. Ordinary glass will answer for materials of low radio-activity.

The composition may be used dry in powdered form or it may be mixed with a liquid, either acid, alkaline, or neutral, such as water, petroleum, or with an oil, varnish, or other liquid to form a luminous paint without affecting its radio-activity.

The mixture of radio-active and radio-responsive material either in a dry condition or mixed with oil, soluble glass, varnish, water, or other media may be applied to clocks to indicate the time, or to measuring instruments of all known types, to numbers upon doors or houses, on medicine-vials or wine-bottles, or objects of any kind for the purpose of showing luminescence in the dark, or it can be used in the practice of medicine for internal examinations or for destroying germs, microbes, bacteria, and the like. The mixture may also be used for scientific or popular toys and for luminous jewels or other ornamental purposes, as also in the general arts.

While I have herein described and broadly claimed a composition containing any one or all of the radio-active materials and radio-responsive materials, I do not herein make specific claims to the use of willemite and zinc compounds, as they are the subject-matter of a separate and companion application, Serial No. 174,492, filed September 24, 1903.

What I claim as new is—

1. A luminous composition containing radio-active material, radio-responsive material, and liquid.
2. A luminous composition containing radio-active material, radio-responsive material, and oil.
3. A luminous composition containing radio-active radium material, radio-responsive material and liquid.
4. A luminous composition containing radio-active radium material, radio-responsive material and oil.
5. A composition containing radio-active material, radio-responsive material and casing or covering of rock-crystal.
6. A composition containing radio-active material and kunzite.
7. A composition containing radium material and kunzite.
8. A composition containing radio-active material, kunzite and liquid.
9. A composition containing radio-active material, kunzite, and translucent covering or casing therefor.
10. A composition containing radio-active material, kunzite and casing or covering of rock-crystal.
11. A composition containing a luminescent compound, a radio-active excitant, and a vehicle therefor.

In testimony whereof I have hereunto set my hand in the presence of two subscribing witnesses.

GEORGE F. KUNZ.

Witnesses:
RAENA H. YUDIZKY,
A. FABER DU FAUR, Jr.